United States Patent [19]

Wakabayashi

[11] Patent Number: 5,024,307
[45] Date of Patent: Jun. 18, 1991

[54] FREE WHEEL HUB SYSTEM

[75] Inventor: Hideaki Wakabayashi, Nagoya, Japan

[73] Assignee: Aisin Seiki Kabushiki Kaisha, Kariya, Japan

[21] Appl. No.: 456,379

[22] Filed: Dec. 26, 1989

[30] Foreign Application Priority Data

Dec. 28, 1988 [JP] Japan .................. 63-168420[U]

[51] Int. Cl.$^5$ ............... B60K 23/08; F16D 41/00
[52] U.S. Cl. ........................... 192/40; 192/50;
192/84 R; 403/1; 180/247; 439/16; 310/239
[58] Field of Search ............ 192/0.02 R, 40, 49,
192/50, 67 R, 84 R; 403/1; 180/247; 310/232,
239, 249; 439/16, 23, 28

[56] References Cited

U.S. PATENT DOCUMENTS

| 3,123,169 | 3/1964 | Young et al. | 192/40 X |
| 4,534,455 | 8/1985 | Fujikawa | 192/40 |
| 4,694,943 | 9/1987 | Petrak | 192/40 X |
| 4,776,441 | 10/1988 | Kagata et al. | 192/0.02 R |
| 4,899,856 | 2/1990 | Kurihara | 192/0.02 R |
| 4,928,804 | 5/1990 | Wakabayashi | 192/84 R X |

FOREIGN PATENT DOCUMENTS

| 60-12336 | 1/1985 | Japan | 180/247 |
| 1-78929 | 3/1989 | Japan | 180/247 |

Primary Examiner—Richard Lorence
Attorney, Agent, or Firm—Burns, Doane, Swecker & Mathis

[57] ABSTRACT

A free wheel hub system comprises a free wheel hub mechanism disposed between a drive shaft and an axle hub supported by a spindle, an electric motor mounted on a hub body accommodating the free wheel hub mechanism, a brush case mounted on the hub body and accommodating bushes connected to the electric motor, and slip-rings mounted on the spindle and contacting the bushes. The brush case is fixed to the hub body before the hub body is attached to the axle hub.

8 Claims, 2 Drawing Sheets

FREE WHEEL HUB SYSTEM

BACKGROUND OF THE INVENTION

1. Field of the Invention

The invention relates to a free wheel hub of a four wheel drive automobile which is able to change electrically between the two wheel driving condition and the four wheel driving condition.

2. Description of the Prior Art

In the prior art motor-driven free wheel hub system shown in FIG. 2, a spindle 2 is mounted on a drive shaft 1 to rotate uniformly, an axle hub 3 is mounted on the spindle 2 through bearings 4, 5. A hub body 6 and a hub cover 8 are fixed to the axle hub 3 by a bolt 7, and an electric motor 9 is mounted in the hub body 6. Between the drive shaft 1 and the axle hub 3, a commonly known free wheel hub mechanism comprising a motor gear 10, a handle gear 11, a handle 12, a cam follower 13, an outer clutch 14 and an inner clutch 15, are disposed. By the rotation of the electric motor, the motor gear 10 rotates the handle gear 11 on the handle 12. Thus, the cam follower 13 moves to the left side shown in FIG. 2 along a cam face 12a which is formed on the outer face of the handle 12 and engages with the cam follower 13. The cam follower 13 causes the outer clutch 14 to engage with the inner clutch 15 which is rotating with the drive shaft 1. Thereby the rotating torque of the drive shaft 1 is transmitted to the axle hub 3, and four wheel driving is achieved.

The current from the battery (not shown) to the electric motor 9 flows through a cord 16 which is wired through a hole 2A formed in the spindle 2. A pair of slip-rings 18 rest on an insulating member 21 which is seated on the outer face of a lock plate 17. The slip rings are electrically connected to the cord 16. The lock plate 17 is assembled to the spindle 2 through a lock nut 22 by a screw 23, with a pair of brushes 19 contacting the slip-rings 18. The brushes 19 are received in a brush case 20 which is assembled to the hub 3. The position of brush case 20 against the hub 3 is determined by means of the position of hub 3 between the bearings 4 and 5. Therefor, tightening the screw 23 by using a special tool (not shown) for assembling the brush case 20 to the hub 3 pre-loads the bearings 4 and 5. It is possible to break the brushes 19 with the special tool if the tool comes in contact with the brush. In order to insert lubricant between the bearings 4 and 5, an extremely careful adjustment requiring a lot of time is necessary or the brushes 19 will damaged.

SUMMARY OF THE INVENTION

It is an object of the invention to provide a free wheel hub system to obviate the above mentioned drawbacks of conventional systems. In order to accomplish the object, a free wheel hub system is provided with a free wheel hub mechanism disposed between a drive shaft and an axle hub supported on a spindle, an electric motor mounted on a hub body accommodating the free wheel hub mechanism, a brush case mounted on the hub body and accommodating brushes connected to the electric motor, and slip-rings mounted on the spindle and contacting the brushes.

DETAILED DESCRIPTION OF THE INVENTION

Figure 1:
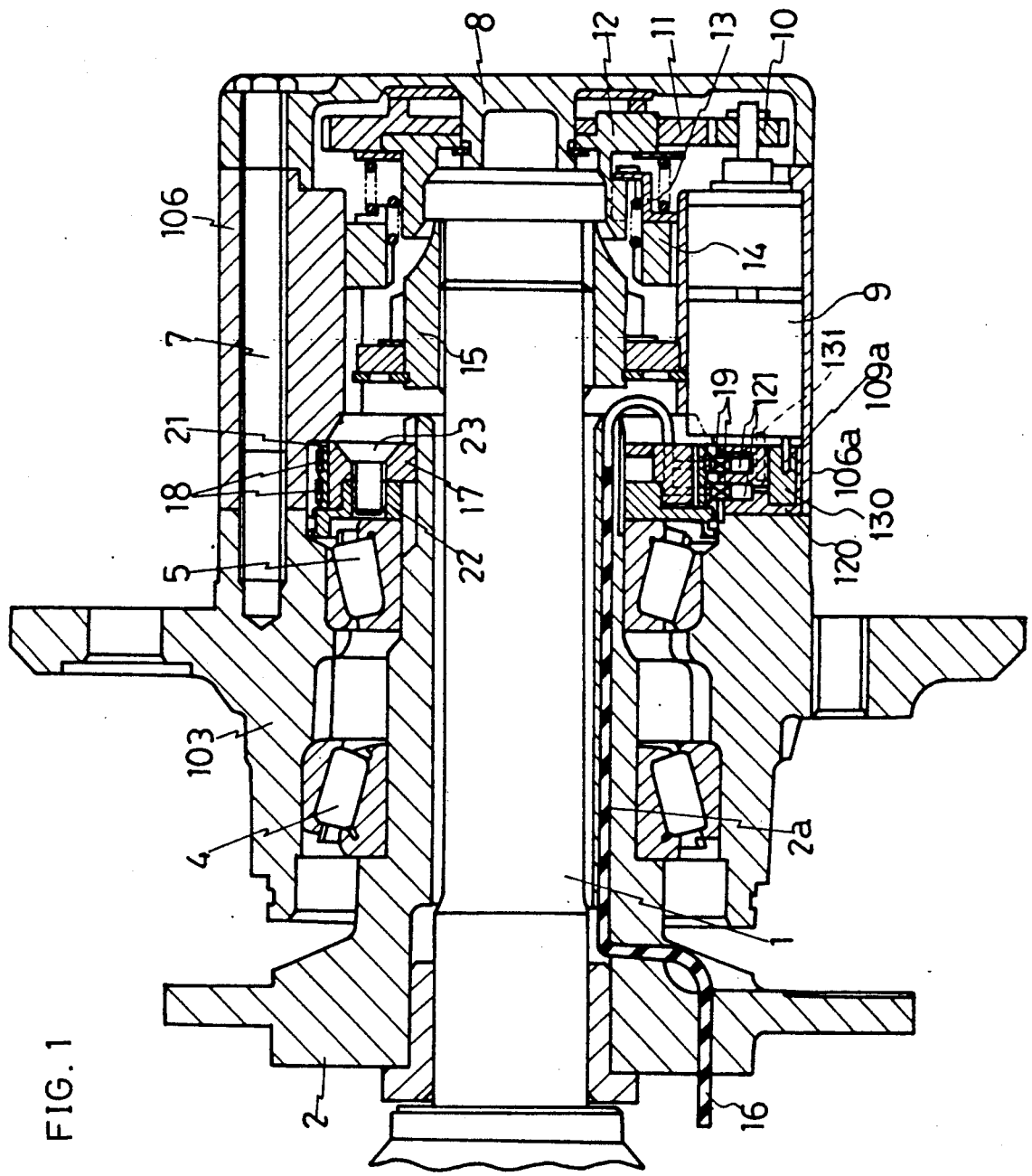
FIG. 1 shows a sectional view of a free wheel hub system of this invention.
Figure 2:
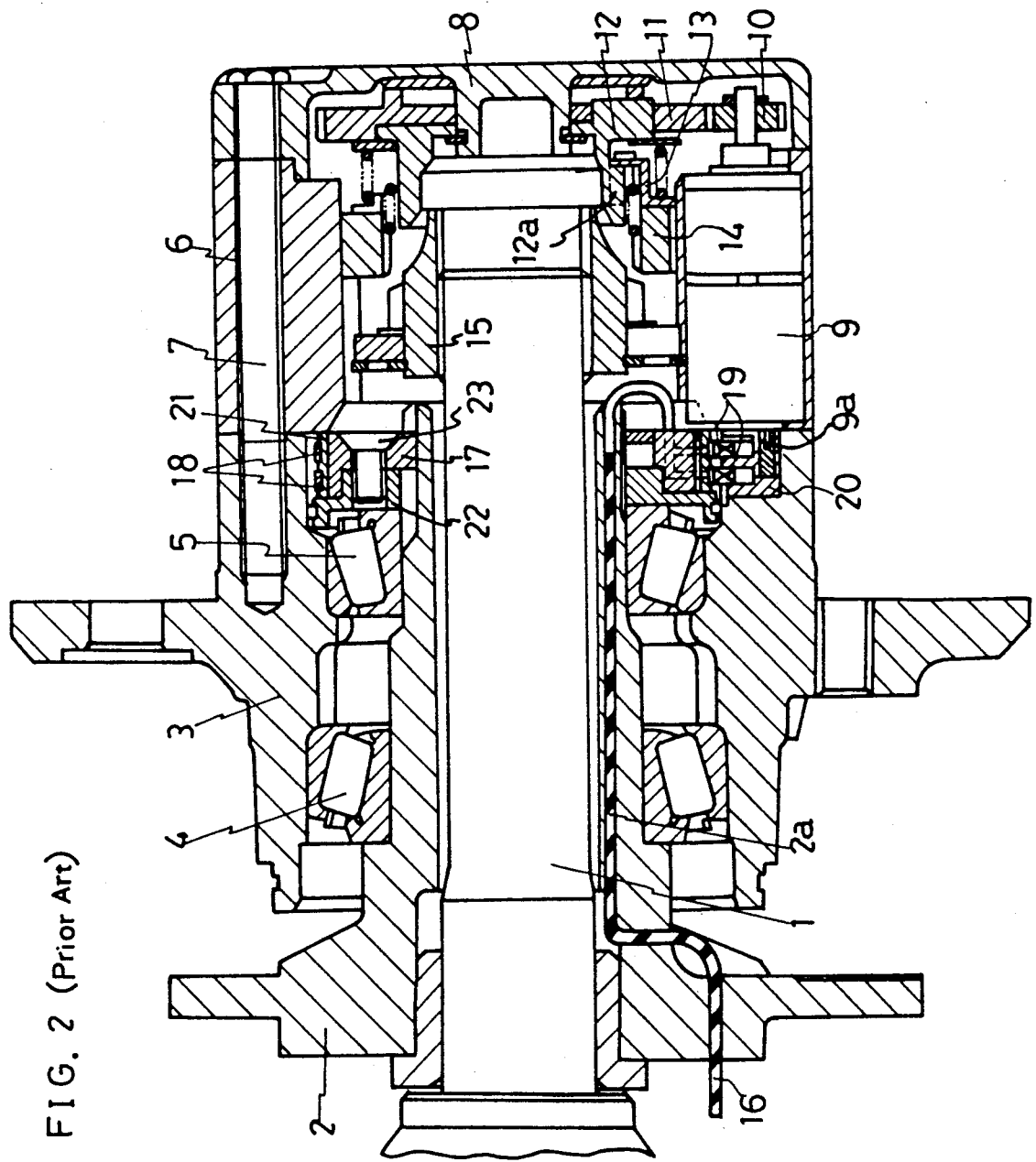
FIG. 2 shows a sectional view of a prior art free wheel hub system.

In FIG. 1, the same parts as shown in FIG. 2 are indicated by the same members. An electric motor 9 and a brush case 120 are mounted on the inner wall of a hub body 106 and thus form with the hub body a unit attachable to the axle hub 103 by bolt 7. Therefore the length of the hub body 106 in FIG. 1 is greater than that of the hub body in FIG. 2 by the width of the brush case 120, and the length of the axle hub 103 in FIG. 1 is smaller than the one of the axle hub in FIG. 2, by the width of the brush case 120. The slip-rings 18 are mounted on a lock plate 17 which is fixed to the axle hub 103, and set in the inner side of the end of the hub body 106. The brush case 120 is fixed to the inner wall of the hub body 106 by adhesive welding or a screw connection 131 and the brushes 19 are connected with the electric motor 19 through springs 121 and female terminals 130 constructed in the brush case 120, with the male terminals 109a being attached to the female terminals 130. Assembling the brush case 120 to the hub body 106 does not preload the bearings 4 or 5, and the brushes do not come into contact with the special tool. Therefore breaking of the brushes is avoided, in addition, the maintenance are lubrication of the hub assembly is easier to perform.

What is claimed is:

1. A free wheel hub system, comprising:
   drive means carrying first electrical contact means,
   an axle hub rotatably mounted on said drive means by bearing means,
   a hub body attachable to said axle hub, and
   a free wheel hub mechanism connected within said hub body for selectively drivably interconnecting said drive means and said axle hub for common rotation,
   said free wheel hub mechanism including an electric motor and a contact case each connected to said hub body independently of said axle hub, whereby said hub body, said electric motor, and said contact case are attachable as a unit to said axle hub, said contact case carrying second electrical contact means electrically connected to said motor and arranged to make electrical contact with said first contact means when said hub body is attached to said axle hub, one of said first and second contact means being spring biased.

2. A free wheel hub system according to claim 1, wherein said drive means includes a drive shaft and a spindle mounted for rotation therewith, said axle hub being rotatably mounted on said spindle.

3. A free wheel hub system according to claim 2, wherein said first contact means comprise slip rings and said second contact means comprise brushes, said brushes constituting said spring-biased contact means.

4. A free wheel hub system according to claim 3, wherein said contact case is fixedly connected to said hub body.

5. A free wheel hub system according to claim 4, wherein said contact case is adhesively bonded to said hub body.

6. A free wheel hub system according to claim 4 including screw fastener means fixedly connecting said contact case to said hub body.

7. A free wheel hub system according to claim 2, wherein one of said electric motor and said contact case includes a female electrical terminal and the other of said electric motor and said contact case includes a male electrical terminal received in said female terminal.

8. A free wheel hub system according to claim 7, wherein said contact case includes said female electrical terminal.

* * * * *